US012005358B2

(12) United States Patent
Nozaki

(10) Patent No.: US 12,005,358 B2
(45) Date of Patent: Jun. 11, 2024

(54) GAME PROCESSING PROGRAM, GAME PROCESSING METHOD, AND GAME PROCESSING DEVICE

(71) Applicant: GREE, INC., Tokyo (JP)

(72) Inventor: Masato Nozaki, Tokyo (JP)

(73) Assignee: GREE, INC., Tokyo (JP)

( * ) Notice: Subject to any disclaimer, the term of this patent is extended or adjusted under 35 U.S.C. 154(b) by 101 days.

(21) Appl. No.: 16/398,977

(22) Filed: Apr. 30, 2019

(65) Prior Publication Data
US 2019/0336858 A1  Nov. 7, 2019

(30) Foreign Application Priority Data
May 1, 2018  (JP) .................... 2018-088174

(51) Int. Cl.
*A63F 13/53* (2014.01)
*A63F 13/25* (2014.01)
*H04L 67/131* (2022.01)

(52) U.S. Cl.
CPC .............. *A63F 13/53* (2014.09); *A63F 13/25* (2014.09); *H04L 67/131* (2022.05)

(58) Field of Classification Search
CPC ................................... A63F 13/25; A63F 13/53
USPC .......................................................... 463/31
See application file for complete search history.

(56) References Cited

U.S. PATENT DOCUMENTS

| 6,267,674 | B1 * | 7/2001 | Kondo .................... A63F 13/10 463/32 |
| 9,317,110 | B2 * | 4/2016 | Lutnick ................ G06V 40/107 |
| 2006/0223635 | A1 * | 10/2006 | Rosenberg ............ A63F 13/216 463/37 |
| 2011/0181703 | A1 * | 7/2011 | Kobayashi ............ A63F 13/213 348/46 |
| 2012/0069131 | A1 * | 3/2012 | Abelow .............. G06Q 30/0601 345/589 |
| 2012/0142415 | A1 * | 6/2012 | Lindsay ............... H04N 5/2224 463/33 |
| 2013/0278631 | A1 * | 10/2013 | Border ................ G06F 3/04842 345/633 |
| 2014/0184550 | A1 * | 7/2014 | Hennessey ............. G06F 3/041 345/173 |

(Continued)

FOREIGN PATENT DOCUMENTS

| JP | 2005-339267 A | 12/2005 |
| JP | 2015-231443 A | 12/2015 |

(Continued)

OTHER PUBLICATIONS

Sep. 15, 2020 Office Action issued in Japanese Patent Application No. 2018-088174.

(Continued)

*Primary Examiner* — Reginald A Renwick
(74) *Attorney, Agent, or Firm* — Oliff PLC

(57) ABSTRACT

A game processing program causes a game control device to control display of an image of a virtual space. The game control device is caused to function as an object identification unit that identifies an object, which a player is observing, from an image that is displayed on a display device. The game control device is further caused to function as a progress management unit that displays support information that is information that is related to the object identified by the object identification unit.

12 Claims, 10 Drawing Sheets

(56) References Cited

U.S. PATENT DOCUMENTS

| | | | | |
|---|---|---|---|---|
| 2016/0121211 A1* | 5/2016 | Ladd | ................ | A63F 13/26 463/33 |
| 2017/0182414 A1* | 6/2017 | Oishi | ................ | A63F 13/5255 |
| 2020/0368616 A1* | 11/2020 | Delamont | ............ | H04N 13/239 |

FOREIGN PATENT DOCUMENTS

| | | |
|---|---|---|
| JP | 2016-131662 A | 7/2016 |
| JP | 2017-113156 A | 6/2017 |
| JP | 6257827 B1 | 1/2018 |

OTHER PUBLICATIONS

Jun. 16, 2020 Office Action issued in Japanese Patent Application No. 2018-088174.

Youtube, "No fear—I Tried Playing SIREN, Day 1" <https://www.youtube.com/watch?v=fm8cx5F8E3I>, screenshots from minute 12:16 to minute 13:31 cited in NPL 1 (Jul. 3, 2016).

VR Google Review, "Device for Enjoying Real Time Viewpoint" <https://web.archive.org/web/20160821221342/http://artifice-inc.com/vr/?p=604> (Aug. 21, 2016).

Partial Translation of VR Google Review, "Device for Enjoying Real Time Viewpoint" <https://web.archive.org/web/20160821221342/http://artifice-inc.com/vr/?p=604> (Aug. 21, 2016).

Game Watch, "Flying Action Game from Bandai Namco" <https://game.watch.impress.co.jp/docs/news/533671.html> (May 18, 2012).

Partial Translation of Game Watch, "Flying Action Game from Bandai Namco" <https://game.watch.impress.co.jp/docs/news/533671.html> (May 18, 2012).

May 31, 2022 Office Action issued in Japanese Patent Application No. 2021-074630.

Dragon Quest Monsters Joker 3, Nintendo DREAM, Ambit Co., Ltd., vol. 21, No. 5, No. 265, pp. 34-35, May 1, 2016.

Jun. 20, 2023 Office Action issued in Japanese Patent Application No. 2021-074630.

* cited by examiner

| IDENTIFIER | TYPE | POSITION | MOVING DIRECTION | MOVING SPEED | ... |

22B

| POSITION | MOVING DIRECTION | MOVING SPEED | ... |

22C

GAME PROCESSING PROGRAM, GAME PROCESSING METHOD, AND GAME PROCESSING DEVICE

This application claims the benefit of priority from Japanese Patent Application No. 2018-088174 filed May 1, 2018, the entire contents of the prior application being incorporated herein by reference.

TECHNICAL FIELD

This invention relates to a game processing program, a game processing method, and a game processing device that displays, on a display, an image of a virtual space.

BACKGROUND TECHNOLOGY

A head mounted display (hereafter referred to as an "HMD") is worn on the head of a user (i.e., player), and the HMD displays toward the user an image of a virtual space. An object included in the image of the virtual space is selected by an operation of a controller by the user (see, for example, Patent Reference 1).

PRIOR ART REFERENCE

Patent Reference

[Patent Reference 1] Japanese Published Patent Application 2005-339267

SUMMARY

Problems to be Resolved

A virtual reality game (hereafter referred to as a "VR game") uses an image of a virtual space displayed by the HMD as a game image. Selection of an object in the game image, movement of an object, generation of an object, disappearance of an object, and the like proceed in accordance with instructions from a player.

Normally, many instructions from a player are only received by an operation of a controller. Increases in types of instructions and increases in opportunities for instructions attract a player to play a game. However, such increases also result in an increase of the number of complex and troublesome operations, such as having to simultaneously operate a plurality of operation buttons. Inconvenience in an operation in a real space may become a factor that causes a player to lose interest in a virtual space. Moreover, the inventors of this application have found that, when the player is wearing the HMD, the player cannot see his hands, such that performing complex operations using the controller in his hands becomes difficult. Also, the inventors have found that, if a user interface (UI) of the controller the player holds is displayed in the virtual space of the HMD, the player loses the sense of immersion in the virtual space.

An object is to provide a game processing program, a game processing device, and a game processing method that enables smooth output of instructions regarding an output of virtual space information. A further object is to reduce the number of operations that must be performed by a player's hands, while maintaining for the player the sense of immersion in the virtual space.

Means of Solving the Problem

A game processing program that solves the above problem is a game processing program that causes a control device to control output of virtual space information. This game processing program causes the control device to function as (i) an object identification unit that identifies an object that a player is observing, from an image of a virtual space that is displayed on a display device, and (ii) a progress management unit that outputs support information, which is information that is related to the object identified by the object identification unit and is advantageous to progress of a game.

According to the above structure, an object (observed object) that is being observed by the player is identified, and support information regarding the identified observed object is output. Thus, the player's observation of the object can be used as an instruction to output the support information. As a result, the instruction regarding the output of the support information can be smoothly output.

The support information may include a future status of the object obtained by the progress management unit. Additionally, the support information may include an attribute of an object, which is disclosed on condition that the object is identified by the object identification unit. Furthermore, the support information may include an image of the virtual space as seen from the object.

The player's observation of the object is an expression of the player's sending his thoughts to the object. The thoughts that are being sent to the object by the player are a desire that the player wants to anticipate the movement of a game character, a desire that the player wants to know the weakness of the game character, a desire that the player wants to understand the image included in the field of view of the game character, or the like. With respect to this point, if the structure uses the various pieces of support information as described above, it is also possible for the game to be played out as if the player's thoughts are realized by the player's ability. As a result, the player can be attracted to the image of the virtual space, and to the playing out of the game using the image of the virtual space.

The support information includes information showing that the object is transitioned to a selected state due to the player's observing, and the progress management unit may cause the movement of another object generated by an operation of the player to follow the movement of the object in the selected state. According to this structure, an instruction to output support information and an instruction to follow an object can be smoothly output.

The object identification unit (i) may set, at part of an image that is displayed on the display device, a region of interest of the player that is identified by a position and an orientation of a specified portion of a body of the player and (ii) may identify at least part of the object that is positioned at the region of interest as an object that is being observed by the player. According to this structure, the observed object may be more accurately identified.

The object identification unit may identify an object that follows the movement of the region of interest in the virtual space as an object that is being observed by the player. When the region of interest of the player moves in the virtual space, it is easy for the movement of the observed object to also follow the movement of the region of interest. The above structure specifically reflects the trend of this observing, and can improve accuracy of identifying the observed object.

Regarding the object identified as being observed by the player, the object identification unit may determine that the player is not observing the object when display of at least part of the object is continually blocked by an obstacle for a specified period of time. The player can easily exclude, from the observed object, the object of which display is being blocked by the obstacle. The above structure specifically reflects the trend of this observing, and can improve accuracy of identifying the observed object.

When the object identified as being observed by the player is a moving body, the object identification unit may determine that the player is continually observing the object for a period of time in which display of at least part of the object is blocked by an obstacle. The above structure specifically reflects the trend of this observing, and can improve accuracy of identifying the observed object.

Effects

According to the game processing program, the game processing method, and the game processing device related to this application, an instruction related to an output of virtual space information may be smoothly output.

MODES TO IMPLEMENT EMBODIMENTS

The following explains an embodiment of a game processing program, a game processing method, and a game processing device. The game processing device identifies an object (observed object) at which a player is carefully looking, from an image of a virtual space that is displayed on the HMD. Regarding the identified observed object, the game processing device extracts information (support information) that is advantageous to the progress of the game and outputs the extracted support information to an HMD.

[HMD]

Figure 1:
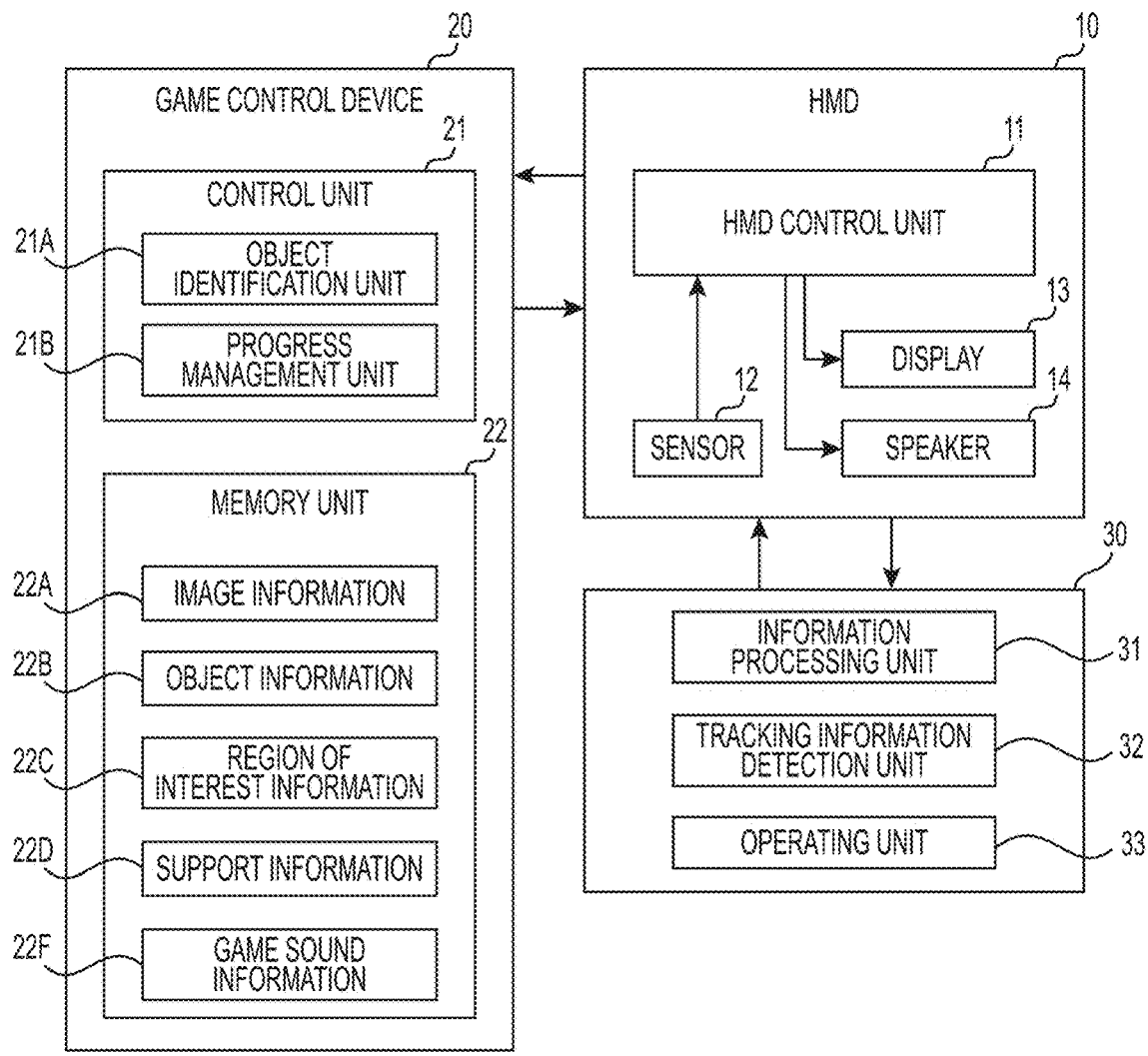
FIG. 1 is a structural diagram showing a structure of an embodiment of a game processing device along with a structure of an HMD.

As shown in FIG. 1, an HMD 10 is provided with an HMD controller 11, a sensor 12, a display 13, and a speaker 14. The HMD 10 outputs various information to the game processing device 20 and inputs various information from the game processing device 20.

The sensor 12 detects a position and an orientation of the HMD 10 in a real space. The sensor 12 is provided with, for example, at least one of a gyro sensor, an acceleration sensor, a geomagnetic sensor, or the like. The sensor 12 may, for example, be further provided with a line-of-sight sensor and may directly detect a direction in which player's observation is directed (line-of-sight direction).

Figure 2:
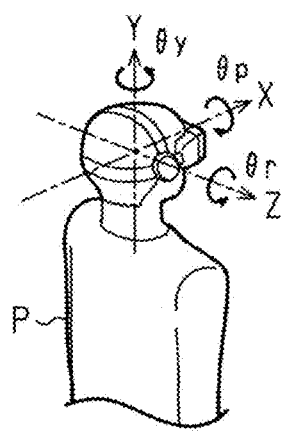
FIG. 2 is a diagram showing a coordinate system used to identify a position and an orientation of a head of a player.

The HMD controller 11 calculates an orientation of a head of a player P (a viewpoint and a line-of-sight direction), using a detection result of the sensor 12. The HMD controller 11 may calculate a position of the head of the player, in addition to the orientation of the head. When the HMD controller 11 calculates the orientation of the head, it is calculated as angles about respective axes. When the HMD controller 11 calculates the position of the head, positions in three-axis directions are calculated. For example, as shown in FIG. 2, the three axes refer to (i) an X axis along a horizontal direction, (ii) a Y axis along a vertical direction, and (iii) a Z axis along a depth direction. Angles about the axes refer to (i) a pitch θp showing a rotational direction about the X axis, (ii) a yaw θy showing a rotational direction about the Y axis, and (iii) a roll θr showing a rotational direction about the Z axis.

The HMD controller 11 includes an input/output interface and transmits the orientation of the head of the player P to the game processing device 20. When the position of the head of the player P of the HMD controller 11 is calculated, the position of the head is transmitted to the game processing device 20. The game processing device 20 calculates the position and the orientation (a viewpoint of a camera and a line-of-sight direction of the camera) of the player P in a virtual space V according to the position, the orientation, or the like of the head of the player P.

The display 13 is an example of a display device. The display 13 outputs a parallax image and visually causes the player P to recognize a three-dimensional image having a sense of depth. Based on the position and the orientation of the player P in the visual space V, the game processing device 20 extracts image data for outputting the parallax image. The game processing device 20 transmits the extracted image data to the HMD 10. The HMD controller 11 causes the image of the visual space V to be displayed on the display 13, using a signal received from the game processing device 20.

A speaker 14 outputs game sounds such as sound effects in a background of the parallax image, voice sounds, and music. The game processing device 20 grasps a progress status of a game and generates sound data for outputting sound that is suitable to the progress status of the game. The game processing device 20 transmits the generated sound data to the HMD 10. The HMD controller 11 uses a signal received from the game processing device 20 to cause the speaker 14 to output sound.

[Operating Device]

An operating device 30 is configured to be able to communicate by wire or wirelessly with the HMD 10 corresponding to the operating device 30 and is carried by the player P by being held by a hand of the player P or by being worn on the arm or hand of the player P.

The operating device 30 is provided with an information processing unit 31, a tracking information detecting unit 32, and an operating unit 33. The information processing unit 31 may include a processor, a memory, a communication interface, and the like. The information processing unit 31 outputs to the HMD 10 (i) a signal corresponding to a detection result of the tracking information detecting unit 32 and (ii) a signal corresponding to an operation upon the operating unit 33. The HMD 10 outputs to the game processing device 20 a signal corresponding to the signal input from the operating device 30.

[Game Processing Device]

The game processing device 20 is configured by various hardware elements such as a Central Processing Unit (CPU), a memory, an application-specific integrated circuit, and the like. The game processing device 20 is provided with (i) a control unit 21 that is an example of a control device and (ii) a memory unit 22. Additionally, regarding a relationship between the game processing device 20 and the HMD 10, one HMD 10 may be connected to one game processing device 20, or a plurality of HMDs 10 may be connected to one game processing device 20.

The control unit 21 causes a hardware element to execute the game processing program and functions as an object identification unit 21A and a progress management unit 21B. The memory unit 22 stores various information used for game progress. Information stored in the memory unit 22 includes image information 22A, object information 22B, region of interest information 22C, support information 22D, and game sound information 22F.

Image information 22A is an example of virtual space information and is information for displaying an image of the virtual space V. The image of the virtual space V includes (i) an image that becomes a background of the virtual space V and (ii) images of objects that exist in the virtual space V. The objects that exist in the virtual space V include (i) an object that only exists in the virtual space V and (ii) an object that exists in the virtual space V corresponding to a real space. The virtual space V is an aggregate of, for example, a finite number of elements (polygons).

Objects are unit elements of images that are displayed on the display 13. The objects include, for example, (i) game characters such as a player character, an enemy character, an ally character, a neutral character, a training character, or the like, (ii) targets such as a shooting game, a simulation fishing game, a simulation sports game, or the like, and (iii) avatars of the player P, a character, or the like. The objects include, for example, game items such as a weapon, protective equipment, magic, a vehicle, a building, a dress-changing-item, or the like. The objects include, for example, indices such as text, an icon, a map, or the like. The objects include (i) an object that can be identified as an observed object and (ii) an object that cannot be identified as an observed object. The objects include (i) an object that can be selected by an operation of the player P and (ii) an object that cannot be selected.

Figures 3, 4, 5:
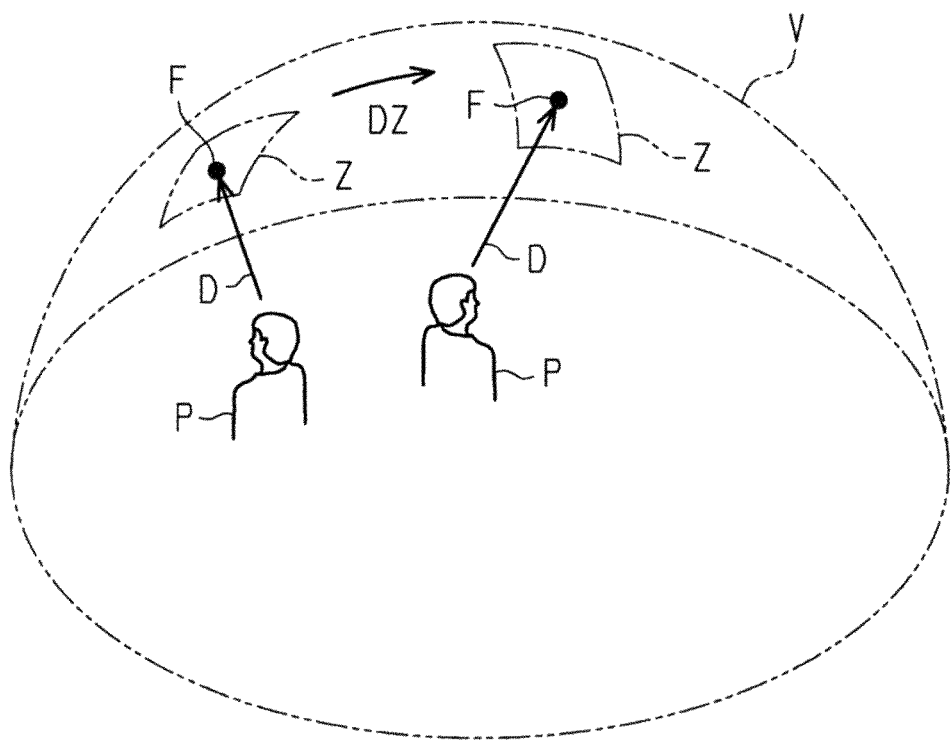
FIG. 3 is a structural diagram showing various information included in object information.
FIG. 4 is a structural diagram showing various information included in region of interest information.
FIG. 5 is a spatial diagram showing positions of a region of interest in a virtual space.

As shown in FIG. 3, the object information 22B includes (i) an identifier of an object, (ii) an object type, and (iii) a position of the object in the virtual space V. The object information 22B may include a moving direction of the object and a moving speed of the object.

The object type shows whether the object can be identified as an observed object. Additionally, the object type shows whether the object can be selected by an operation of the player P. Furthermore, the object type shows whether the object is a moving body. The moving direction of the object refers to (i) a direction in which the object faces or (ii) a direction corresponding to a direction in which another object faces. The moving speed of the object refers to (i) a pre-set speed or (ii) a speed matching the moving speed of another object. As the game proceeds, the position, the moving direction, and the moving speed of the object are updated by the control unit 21.

As shown in FIG. 4, the region of interest information 22C includes a position of a region of interest Z in the virtual space V. The region of interest information 22C may also include a moving direction of the region of interest Z and a moving speed of the region of interest Z.

As shown in FIG. 5, the region of interest Z is in a range of the virtual space V in which the player P presumably is interested. For example, the region of interests Z is positioned at a center of an image that is displayed by the HMD 10. In a line-of-sight direction D of the player P, the region of interests Z is surrounded by a specified frame, such as a rectangular frame, a round frame, or the like, having a specified size. A moving direction DZ of the region of interest Z is a direction in which the region of interest Z has shifted in a specified time until the object reaches an updated position. A moving speed of the region of interest Z is a speed at which the region of interest Z has shifted within the specified time until the object reaches the updated position. As the game proceeds, the region of interest information 22C is updated by the control unit 21.

The support information 22D is an example of virtual space information and is information corresponding to an identifier of an object. For example, the support information 22D is information that is advantageous to progress of a game. The support information 22D defines an output format of the support information 22D at the HMD 10. The output format of the support information 22D is an image output, a sound output, and a combination of an image output and a sound output. The progress management unit 21B refers to a current observed object and extracts from the support information 22D information corresponding to the observed object. When the progress management unit 21B determines that it is in a state in which the support information 22D is to be output, the extracted support information 22D is output to the HMD 10 in an output format that is defined by the support information 22D.

The game sound information 22F is an example of virtual space information and is information for causing the HMD 10 to output game sound. The progress management unit 21B extracts from the game sound information 22F information for outputting game sound that causes awareness in the player P, and transmits the extracted information to the HMD 10.

[Identification of Region of Interest]

The object identification unit 21A identifies a field of vision (angle of view) of the player P in the virtual space V, based on the orientation of the head of the player P. When the position of the head is calculated, the position of the head may be used. The object identification unit 21A extracts from the image information 22A information for displaying an image according to the field of vision of the player P and transmits the extracted information to the HMD 10.

The object identification unit 21A identifies the region of interest Z. The object identification unit 21A sets the region of interest Z in the center portion of the angle of view that is identified according to the orientation of the head of the player P.

The object identification unit 21A may identify the region of interest Z, using a line of sight that is identified according to the orientation of the head of the player P. A known method is used for a method that identifies the line of sight of the player P in the virtual space V. For example, based on the orientation of the head of the player P, the object identification unit 21A (i) identifies a first straight line connecting a left-eye position with a right-eye position in the virtual space V and (ii) identifies a second straight line that extends in a direction perpendicular to the first straight line and goes through a middle point between the left-eye position and the right-eye position as a line of sight. Alternatively, based on a result of the line of sight detected by the sensor 12, the object identification unit 21A identifies an observed point F (see FIG. 5) that is a point of intersection of the lines of sight of the left eye and the right eye. The object identification unit 21A may identify, as the line of sight, a straight line that goes through (i) a middle point between the right-eye position and the left-eye position and (ii) the identified observed point F. For example, in the virtual space V, the object identification unit 21A identifies, as the region of interest Z, a region within a specified frame that is positioned in a line-of-sight direction D from a viewpoint of the player P. In the same manner as for the position and the orientation of the head of the player P, every time the object identification unit 21A inputs information for identifying the region of interest Z, it identifies the region of interest Z and updates the region of interest information 22C.

As a first region example of identification of the region of interest Z, the object identification unit 21A identifies, for example, a region that uses a line of sight of the player P as a center, as the region of interest Z. When the line of sight of the player P is only calculated from the position and the orientation of the head of the player P, the region of interest Z is identified regardless of the observed point F. That is, there are cases that the region of interest Z in a first observation example may or may not include the observed point F. Additionally, every time the position and the orientation of the head of the player P is input, based on this input, the object identification unit 21A identifies the region of interest Z and updates the region of interest information 22C.

As a second region example of identification of the region of interest Z, the object identification unit 21A identifies, for example, a region that is a direction in which the line of sight of the player P faces, and which uses the observed point F as a center, as the region of interest Z. When the line of sight of the player P is calculated based on (i) the position and the orientation of the head of the player P and further (ii) the lines of sight of the right eye and the left eye, the region of interest Z is identified based on the observed point F of the player P. Additionally, every time the position and the orientation of the head of the player P, and the lines of sight of the right eye and the left eye are input, based on this input, the object identification unit 21A identifies the region of interest Z and updates the region of interest information 22C.

Additionally, the object identification unit 21A traces, for example, for a specified time up to the present time, the position of the region of interest Z and updates movement of the region of interest Z in the virtual space V for each identification of the region of interest Z.

[Identification of Object]

The object identification unit 21A identifies an observed object from within an image of the virtual space V that is displayed on the HMD 10. Every time information for identifying the observed object is input, the object identification unit 21A refers to the object information 22B and identifies and updates the observed object.

As a first observation example of identification of an observed object, the object identification unit 21A uses (i) a position of each object that is displayed on the HMD 10 and can be identified and (ii) the position of the updated (i.e., latest) region of interest Z. Furthermore, the object identification unit 21A identifies, as an observed object, an object of which at least a portion is positioned at the region of interest Z. Additionally, when a plurality of objects are positioned at the current region of interest Z, the object identification unit 21A identifies, as an observed object, for example, (i) an object closest to the center of the region of interest Z or (ii) an object closest to the observed point F.

As a second observation example of identification of an observed object, the object identification unit 21A uses, for example, (i) a position of each object that is displayed on the HMD 10 and can be identified and (ii) the position of the updated region of interest Z. Furthermore, the object identification unit 21A (i) measures time during which each object is continuously positioned at the updated region of interest Z and (ii) identifies, as an observed object, an object of which at least a portion is continuously positioned at the region of interest Z for a specified time. Additionally, when a plurality of objects are positioned at the region of interest Z for the specified time, the object identification unit 21A identifies, as an observed object, for example, (i) an object closest to the center of the region of interest Z or (ii) an object closest to the observed point F.

As a third observation example of identification of an observed object, the object identification unit 21A uses, for example, (i) a position of each object that is displayed on the HMD 10 and can be identified and (ii) a position of the observed point F. Furthermore, the object identification unit 21A identifies, as an observed object, an object that is positioned at the observed point F. Additionally, when a plurality of objects are positioned at the observed point F, for example, the object identification unit 21A identifies, as an observed object, an object closest to a viewpoint of the player P in the virtual space V.

As a fourth observation example of identification of an observed object, for example, the object identification unit 21A uses (i) movement of each object that is displayed on the HMD 10 and can be identified (a moving direction and a moving speed) and (ii) movement of the region of interest Z for a specified time up to the present time (a moving direction and a moving speed). Furthermore, the object identification unit 21A identifies, in the virtual space V, as an observed object, an object that follows the movement of the region of interest Z. Additionally, when a plurality of objects follow the movement of the region of interest Z, the object identification unit 21A identifies, as an observed object, for example, an object having the smallest amount of movement with respect to the region of interest Z.

As a fifth observation example of identification of the observed object, the object identification unit 21A determines whether the identified observed object is a moving body. Additionally, when the identified observed object is a moving body, the object identification unit 21A continuously identifies the object as an observed object even if at least part of the object is prevented from being displayed by another object (obstacle). In contrast, when the identified observed object is a stationary body, the object identification unit 21A cancels the identification of the object if at least part of the object is prevented from being displayed by an obstacle.

As a sixth observation example of identification of an observed object, for example, the object identification unit 21A determines whether the identified observed object is prevented from being displayed by an obstacle. Additionally, the object identification unit 21A measures time during which the object is prevented from being displayed by the obstacle, and when at least part of the object is continuously prevented from being displayed by the obstacle for a specified time, the object identification unit 21A cancels the identification of the object.

[Support Processing]

The progress management unit 21B manages game progress so as to receive an operation by the player P, and causes the HMD 10 to output, based on the received operation. The progress management unit 21B receives the player P's observation of an object as an operation by the player P.

The progress management unit 21B monitors a status of game progress and determines whether a condition is established that causes output of the support information 22D. When a condition for outputting the support information 22D is established, and the observed object is identified, the progress management unit 21B outputs the support information 22D to the HMD 10. As a condition that causes output of the support information 22D, for example, the game has proceeded to a specified stage. Additionally, as a condition that causes output of the support information 22D, for example, a parameter associated with a player has reached a specified value. Furthermore, as a condition that causes output of the support information 22D, for example, a player has a specified game medium. The specified stage is, for example, a stage at which an operation by a controller becomes complex. A specified level is, for example, a level at which an operation by a controller becomes complex. The game medium is electronic data used for a game that is implemented by the game processing device 20 and may be used by a player as a method of obtaining, owning, using, managing, exchanging, composing, enforcing, selling, disposing, donating, or a method other than listed herein, within the game. The game medium includes, for example, a card, an item, virtual currency, a ticket, a character, an avatar, level information, status information, parameter information (a physical strength level value, an offensive capability, or the like), a capability information skill, an ability, a spell to curse, a job, or various electronic data other than listed herein that may be used in a game. A game medium that may be used in the game processing device 20 and a mode(s) of using the game medium are not limited to what is shown in this specification.

The progress management unit 21B refers to the observed object that is being identified by the object identification unit 21B and extracts the support information 22D corresponding to the observed object. The progress management unit 21B causes the HMD 10 to output the extracted support information 22D.

As a first output example of causing the HMD 10 to output the support information 22D, for example, the progress management unit 21B causes the HMD 10 to output a future status of the observed object. The future status of the observed object is obtained by the progress management unit 21B obtaining a status of the observed object after a specified time elapses.

For example, the future status of the observed object refers to movement of a game character when the observed object is a game character, and refers to movement immediately after the support information 22D showing the future status is output. Additionally, for example, the future status of the object refers to movement of a game item when the observed object is a game item, and refers to movement immediately after the support information 22D showing the future status is output. Additionally, the support information 22D may be a combination of information showing a plurality of types of future statuses.

For example, the progress management unit 21B causes the HMD 10 to display a trajectory in which the observed object moves, as a future status of the observed object. Additionally, as the future status of the observed object, the progress management unit 21B (i) causes the HMD 10 to display a destination to which the observed object moves or (ii) causes on the HMD 10 to output the destination by sound.

As a second output example of causing the HMD 10 to output the support information 22D, for example, the progress management unit 21B causes the HMD 10 to output an attribute of the observed object. The attribute of the observed object is an attribute that is disclosed for the first time as the object is identified as an observed object.

For example, when the observed object is a game character, the attribute of the observed object is strengths/weaknesses of the game character, a position or a region in which the observed object may effectively attack, and a state of mind of a game character. Also, for example, when the observed object is a game item, the attribute of the observed object is a benefit or an incentive that is generated from the game item.

For example, the progress management unit 21B causes the HMD 10 to display a capability, strengths/weaknesses, a state of mind, and the like of a game character as text that accompanies the observed object. Additionally, the progress management unit 21B causes the HMD 10 to output by sound, for example, a capability, strengths/weaknesses, a state of mind, and the like of the observed object as an attribute of the observed object. Furthermore, the support information 22D may be a combination of information showing plural types of attributes.

As a third output example of causing the HMD 10 to output the support information 22D, the progress management unit 21B causes the HMD 10 to output an image showing that the observed object is transitioned to a selected state. At this time, the progress management unit 21B may make another object generated by an operation of the player P follow the movement of the observed object in the selected state.

For example, the progress management unit 21B causes to be displayed, in the surrounding of the observed object, an indicator showing the observed object has transitioned to the selected state. Alternatively, a display mode of the observed object may be changed. For example, the progress management unit 21B causes the observed object in the selected state to follow a target of a weapon generated by the operation of the player P.

As a fourth output example of causing the HMD 10 to output the support information 22D, for example, the progress management unit 21B causes the HMD 10 to output, for a specified time, an image of a field of view of the observed object in the virtual space V.

For example, when the object identification unit 21A identifies the observed object, the progress management unit 21B causes the object identification unit 21A to change a direction for extracting an image to a direction toward a viewpoint of the player P from the observed object. Furthermore, the progress management unit 21B causes the object identification unit 21A to change an image that is caused to be extracted by the object identification unit 21A, using the changed direction as a center. Additionally, the progress management unit 21B causes the HMD 10 to output, for a specified time from the identification of the observed object, an image of the field of view of the observed object in the virtual space V.

Furthermore, according to at least one of (i) the parameter associated with the player P or (ii) the game medium owned by the player, the output mode of the support information 22D may also be changed. For example, when the parameter associated with the player P satisfies a specified condition, a future status, from the time at which the support information 22D is output to the time when one second has elapsed, may be output, and when the parameter associated with the player P does not satisfy a specified condition, a future status, from the time at which the support information 22D is output to the time when 0.5 second has elapsed, may be output. Additionally, when the parameter associated with the player P satisfies a specified condition, an object is output in a selected state only for a specified first time, and when the parameter associated with the player P does not satisfy a specified condition, the object may be output in a state in which the object is in a selected state only for specified second time shorter than the first time. Furthermore, when the parameter associated with the player satisfies a specified condition, a plurality of objects may be made to be selectable, and when the parameter associated with the player P does not satisfy a specified condition, only one object may be made to be selectable. Also, when the parameter associated with the player P satisfies a specified condition, the support information 22D may be output as not only an image but also sound, and when the parameter associated with the player P does not satisfy a specified condition, the support information 22D may be output as an image only. Alternatively, when the parameter associated with the player P satisfies a specified condition, the support information 22D may be output, and when the parameter associated with the player P does not satisfy a specified condition, the support information 22D may not be output.

[Game Processing]

Figure 6:
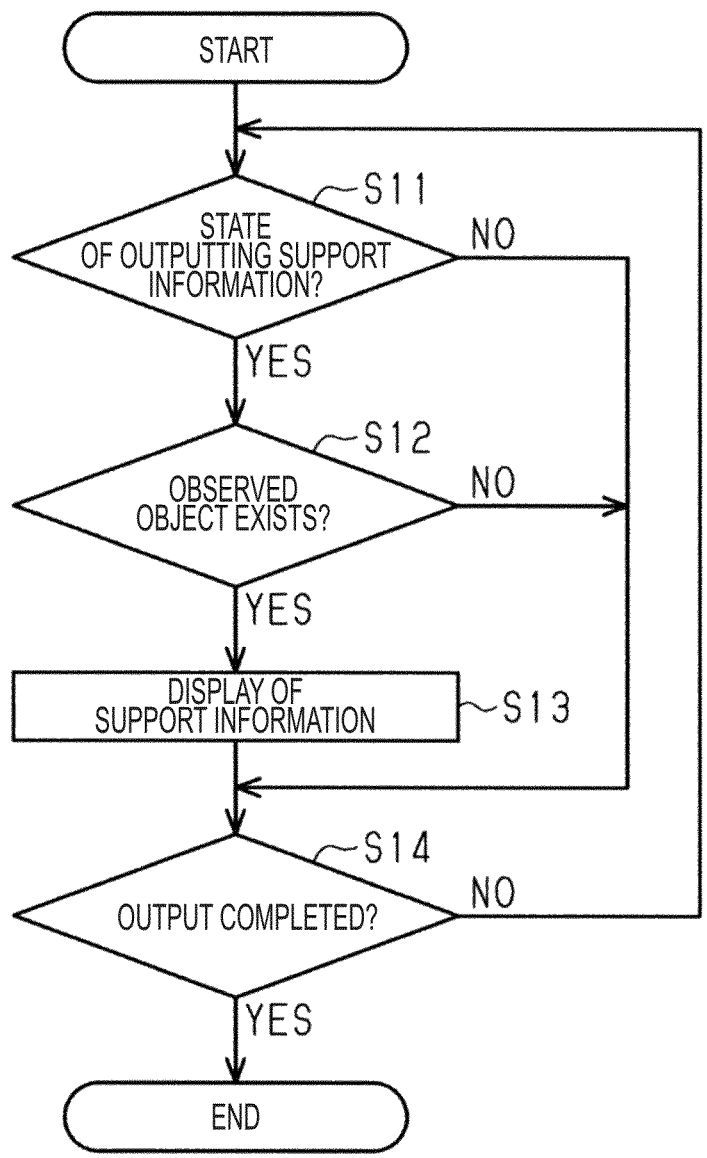
FIG. 6 is a flowchart showing a procedure of output processing of support information.

As shown in FIG. 6, once the game begins, the progress management unit 21B determines whether the game progress is in a status in which the support information 22D is to be output (step 11). When the progress management unit 21B determines that the progress of the game is not in a status in which the support information 22D is to be output (NO at step S11), the determination of whether the progress of the game is in a status in which the support information 22D is to be output is repeated (NO at step S14) until the status of the progress of the game becomes a status in which the support information 22D is to be output.

When the progress management unit 21B determines that the status of the progress of the game is in a status in which the support information 22D is to be output (YES at step S11), the object identification unit 21A determines whether an observed object exists among images of the virtual space V that are caused to be displayed by the HMD 10 (step S12). When the control unit 21 determines that there is no observed object (NO at step S12), until an observed object is identified from among the images of the virtual space V, the determination of whether the support information 22D is to be output (step S11) and the determination of whether an observed object exists (step S12) are repeated.

When the object identification unit 21A determines that there is an observed object (YES at step S12), the progress management unit 21B outputs the support information 22D (step S13). Then, when the progress management unit 21B completes the output of the support information 22D (YES at step S14), the output processing of the support information 22D is complete this time.

The order of (i) determining whether the progress of the game is in a status in which the support information 22D is to be output (step S11) and (ii) determining whether there is an observed object (step S12) does not matter. For example, the determination of whether there is an observed object (step 12) may be performed first, and when an observed object is identified (YES at step S12), the determination of whether the progress of the game is in a status in which the support information 22D is to be output (step S11) may be performed. Alternatively, the determination process of step S11 and the determination process of step S12 may be simultaneously performed, and if an observed object exists and the progress of the game is in a status in which the support information 22D is to be output, the support information 22D may be output.

Output Examples

The following explains output examples of the support information 22D.

Figure 7A:
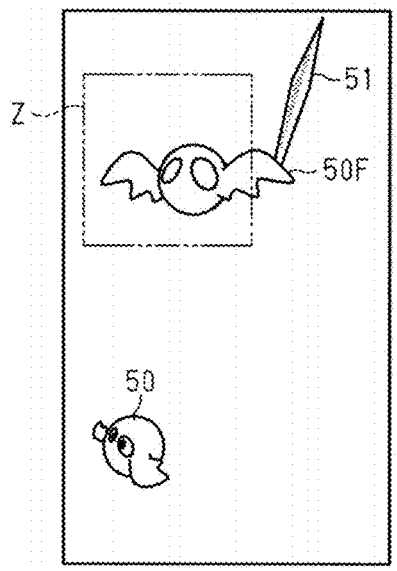
FIG. 7A is an image diagram showing an example of identification of an observed object.
Figure 7B:
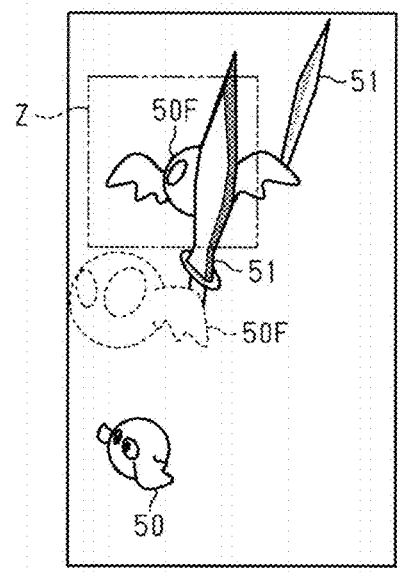
FIG. 7B is an image diagram showing an output example of support information.
Figure 7C:
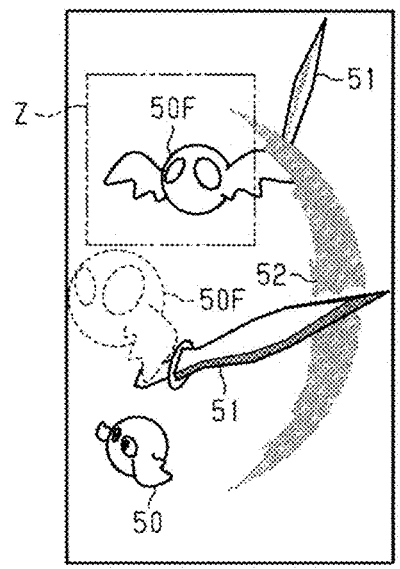
FIG. 7C is an image diagram showing an output example of support information.

FIG. 7 shows a first output example of outputting a future status of the observed object as the support information 22D. Furthermore, in the examples shown in FIGS. 7A-7C, the game processing device 20 identifies a region of interest Z according to the first or second region example and identifies an observed object according to the first or second observation example.

Based on the position of the region of interest Z, the game processing device 20 identifies the observed object, from among objects 50 that are displayed on the HMD 10. For example, as shown in FIG. 7A, the game processing device 20 identifies, as an observed object, (i) an enemy character 50F, at least portion of which is positioned in the region of interest Z or (ii) an enemy character 50F, at least portion of which is positioned in the region of interest Z for a specified time. As an object accompanying the observed object, the enemy character 50F has a sword 51 that is a game item.

Every time the observed object is identified, the game processing device 20 extracts the support information 22D corresponding to the observed object. For example, the game processing device 20 extracts the support information 22D corresponding to the enemy character 50F. The support information 22D corresponding to the enemy character 50F shows a status (future status) of the enemy character 50F immediately after the support information 22D is output.

For example, the future status of the enemy character 50F includes (i) a status in which the enemy character 50F attacks the player character or (ii) a status in which the enemy character 50F escapes from the player character. For example, the game processing device 20 anticipates, from the status of the progress of the game, movement selected by the enemy character 50F. Additionally, the game processing device 20 extracts, as the support information 22D, movement of the enemy character 50F, movement of the sword 51, and sound effects that accompany these movements, immediately after the support information 22D is output.

When it is determined that the support information 22D can be output, the game processing device 20 causes the HMD 10 to output a future status of the observed character, that is, a future status of the enemy character 50F. For example, as shown in FIG. 7B, the game processing device 20 may display an image of the enemy character 50F that is approaching the player P. The position of the enemy character 50F shown by broken lines in FIG. 7B shows a future position that will be a position of the enemy character 50F when a lead time that is a specified time has elapsed. The lead time is a fixed time, for example, one second. Alternatively, the lead time is a fixed time that is set according to each character. Alternatively, the lead time is a fluctuating time that changes according to the time for which the enemy character 50F is observed.

The future position of the enemy character 50F is a position of the enemy character 50F at the time the lead time has elapsed. Alternatively, the future position of the enemy character 50F is a position of the enemy character 50F after the lead time has elapsed. The enemy character 50F shown by broken lines is a future enemy character 50F and is an example of a future status of the enemy character 50F. The future enemy character 50F is continuously displayed until after a specified time has elapsed. Alternatively, the future enemy character 50F is blinkingly displayed while the specified time is elapsing.

The future enemy character 50F is erased when the specified time has elapsed. Alternatively, the future enemy character 50F is erased before the lead time has elapsed after the future enemy character 50F is displayed. Alternatively, the future enemy character 50F is erased when the lead time has elapsed after the future enemy character 50F is displayed. That is, the future enemy character 50F is erased at the timing when the enemy character 50F shown by solid lines overlaps the enemy character 50F shown by broken lines after the future enemy character 50F shown by broken lines is displayed.

Furthermore, as shown in FIG. 7C, as a future status, an image of a slashing attack 52 (predictive line) that the enemy character 50F approaching the player P sends toward the player P may be displayed. In FIG. 7C, the slashing attack 52 shows movement of the sword 51 held by the future enemy character 50F. However, if the position of the future enemy character 50F is the same as that of the current enemy character 50F, the future enemy character 50F may not need to be displayed. Alternatively, even if the position of the future enemy character 50F is different from that of the current enemy character 50F, the future enemy character 50F may not be displayed, and only movement of the sword 51 held by the future enemy character 50F may be displayed.

The slashing attack 52 by the future enemy character 50F shows, for example, a trajectory of the sword 51 until after a specified movement time (for example, one second) further elapses since the lead time has elapsed. An operating time that establishes the trajectory of the sword 51 is a time during which the future enemy character 50F begins and completes a specified operation using the sword 51. Alternatively, an operating time that establishes the trajectory of the sword 51 is a fixed time that is one second after the future enemy character 50F beings a specified operation using the sword 51. The slashing attack 52 by the future enemy character 50F is erased before the lead time elapses after the slashing attack 52 by the future enemy character 50F is displayed. Alternatively, the slashing attack 52 by the future enemy character 50F is erased when the lead time elapses after the slashing attack 52 by the future enemy character 50F is displayed. Alternatively, the slashing attack 52 by the future enemy character 50F is erased in order from the location that is traced by the sword 51 held by the enemy character 50F. Additionally, as the slashing attack 52 is being displayed, the game processing device 20 may output to the HMD 10 a sound effect such as "swish."

Thus, anticipation of the progress by the player P may be realized by an instruction operation of the player P's focus. Additionally, an object of anticipating the progress is to know whether the enemy character 50F will attack, and if so, how the enemy character 50F will attack.

Furthermore, visual observation of an object by the player P is usually movement for knowing the progress of the game and is also movement that is repeated over an entire period of time in which the game progresses. Additionally, visual observation of an object by the player P is also an extension of such visual observation. That is, visual observation of an object by the player P is an extension of natural movement by the player P so as to make progress in the game. The game processing device 20 uses the extension of such natural movement as an operation itself. Because of this, an operation of displaying a future status may be made smooth.

Additionally, the player P's observation of the enemy character 50F is also an indication of the player's thoughts, that is, the player wants to anticipate the movement of the enemy character 50F. Furthermore, (i) outputting of an image in which the enemy character 50F is approaching the player P or (ii) outputting of an image in which the enemy character 50F is sending the slashing attack 52 toward the player P realizes the player's thoughts. That is, the game processing device 20 changes the output in the virtual space V according to the movement in the real space in which the player P sends his thoughts. Additionally, an image and/or sound is output which realizes the player P's thoughts. Because of this, the player may increase the satisfaction with playing the game, and repeatedly use a VR game.

Figure 8A:
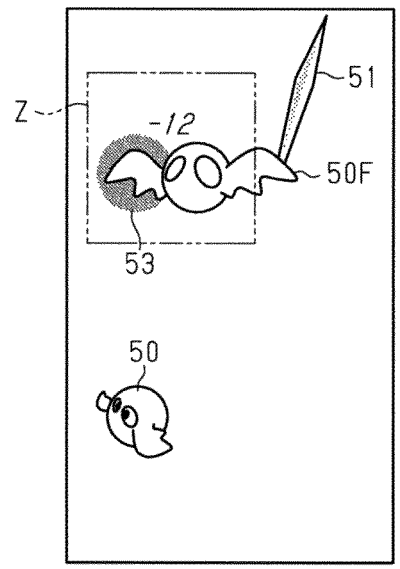
FIG. 8A and FIG. 8B are image diagrams showing output examples of support information.

FIG. 8A shows an example (second output example) in which an attribute of the observed object is caused to be output as the support information 22D. Furthermore, in the example shown in FIG. 8A, the game processing device 20 (i) identifies the region of interest Z according to the first or second region example and (ii) identifies an observed object according to the first or second observation example.

In the same manner as in FIGS. 7A-7C, the game processing device 20 identifies the enemy character 50F as an observed object. Next, the game processing device 20 extracts the support information 22D corresponding to the enemy character 50F.

At this time, the game processing device 20 grasps the progress of the game and determines which attribute should be output as the support information 22D. For example, in a state in which the player P presumably persists in defeating the enemy character 50F, the game processing device 20 sets (i) a weakness of the enemy character 50F and (ii) a position or a region effectively affected by the attack as attributes of the enemy character 50F. Furthermore, the weakness of the enemy character 50F is an attribute that is disclosed for the first time on condition that the enemy character 50F is identified as an observed object, that is, the enemy character 50F is observed by the player P.

When it is determined that the support information 22D can be output, as shown in FIG. 8A, the game processing device 20 causes the HMD 10 to display a weakness indicator 53 of the enemy character 50F. The weakness indicator 53 of the enemy character 50F refers to, for example, (i) a display effect that emphasizes a right wing of the enemy character 50F, which is a weakness, and (ii) a low defense value "−12" showing that this is a weakness.

Thus, understanding of an attribute(s) by the player P may be realized by an instruction operation of the player P's observation. Additionally, in a state in which the player P presumably persists in defeating the enemy character 50F, the player P's observation of the enemy character 50F is also an indication of his thoughts, that is, he wants to know a weakness of the enemy character 50F. That is, the game processing device 20 changes the output in the virtual space V according to the movement in the real space by which the player P sends his thoughts, and further outputs an image that realizes his thoughts more accurately, assuming a state in which his thoughts are being sent. Because of this, the player may increase the satisfaction with playing the game and repeatedly use the VR game.

Additionally, on condition that the enemy character 50F is observed by the player P, the weakness of the enemy character 50F is disclosed for the first time. Because of this, the fact that knowing the weakness of the enemy character 50F is special, that is, the fact that the player P's observation so as to send his thoughts is special, is strongly impressed upon the player P. Furthermore, the realization of the transmitted thoughts is accomplished for the first time via identification of the observed object and the output of the support information 22D, and is special to start with. Because of this, the fact that knowing the weakness of the enemy character 50F is special is further impressed upon the player P. As a result, importance of the operation by observation can be further increased by performance of the game.

Figure 8B:
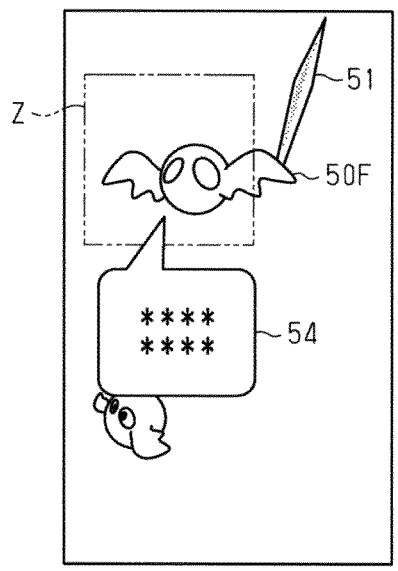

FIG. 8B shows another second output example in which an attribute of the observed object is output as the support information 22D. Additionally, in the example shown by FIG. 8B as well, the game processing device 20 identifies the region of interest Z according to the first or second region example and identifies the observed object according to the first or second observation example.

In the same manner as in the example shown in FIG. 8A, the game processing device 20 identifies the enemy character 50F as the observed object. Next, the game processing device 20 extracts information for displaying a state of mind of the enemy character 50F as the support information 22D corresponding to the enemy character 50F.

At this point, the game processing device 20 understands the progress of the game and determines which state of mind should be output as the support information 22D.

The state of mind of the enemy character 50F is to output a state of mind of the enemy character 50F from the standpoint of the enemy character 50F. The enemy character 50F has, for example, an aggressive state of mind, which is output as text 54 or sound such as "I will attack by slashing from the right side!" Alternatively, the enemy character 50F has, for example, an escape state of mind, which is output as text or sound such as "Let's run away from this player as soon as possible." Alternatively, the enemy character 50F has, for example, a defensive state of mind, which is output as the text 54 or sound such as "My weak right wing needs to be protected." For example, the game processing device 20 sets an aggressive state of mind for the enemy character 50F in a state in which the player P is presumed not to being accustomed to fighting. For example, the game processing device 20 sets an escape state of mind for the enemy character 50F in a state in which the player P is presumed to persist in defeating the enemy character 50F.

Once it is determined that the support information 22D can be output, as shown in FIG. 8B, the game processing device 20 causes the HMD 10 to output the state of mind of the enemy character 50F by the text 54 or sound.

Thus, understanding of the state of mind of the player P can be realized by an instruction operation of the player P's observation. Additionally, the player P observing the enemy character 50F shows his thoughts of wanting to know the state of mind of the enemy character 50F. That is, the game processing device 20 (i) changes the output in the virtual space V according to the movement in the real space by which the player P transmits his thoughts, (ii) further predicts a state in which his thoughts are transmitted, and (iii) outputs an image in which his thoughts are more accurately realized. Because of this, the player may increase the satisfaction with playing the game and repeatedly use the VR game.

Figure 9A:
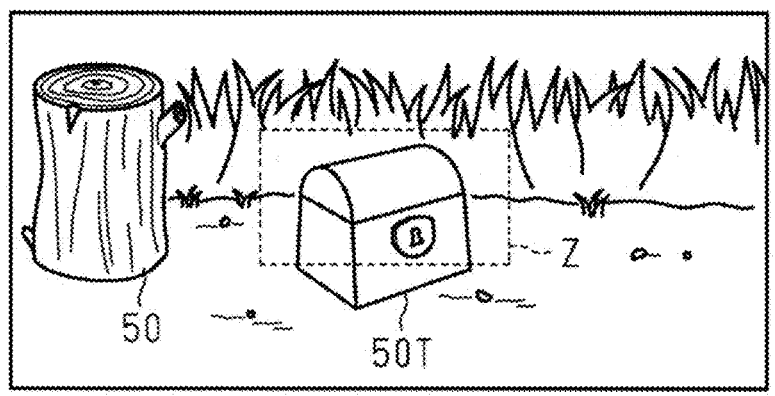
FIG. 9A is an image diagram showing an example of identification of an observed object.
Figure 9B:
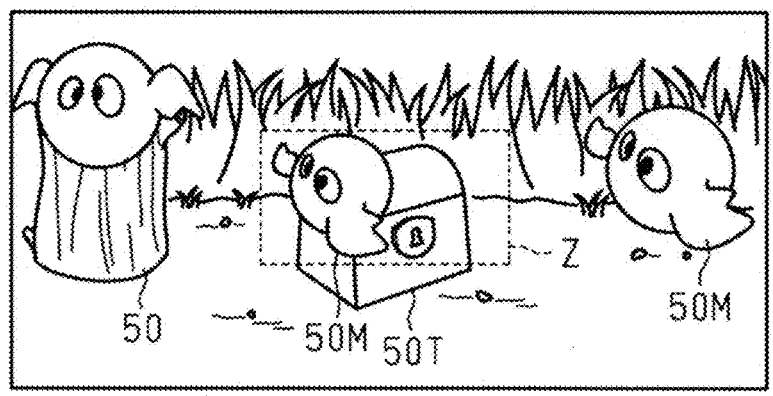
FIG. 9B is an image diagram showing an example in which the observed object is continually identified.
Figure 9C:
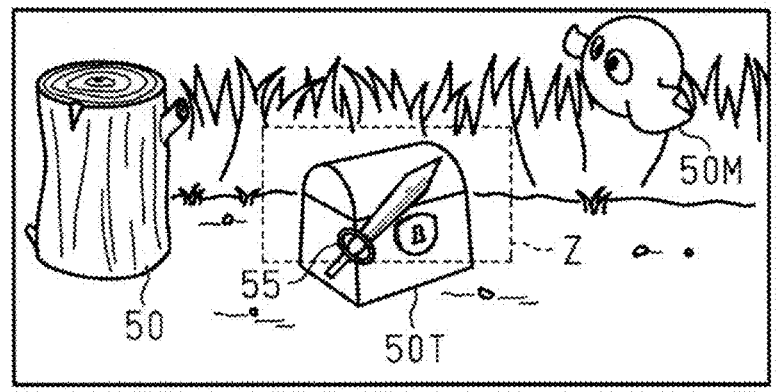
FIG. 9C is an image diagram showing an output example of support information.

FIGS. 9A-9C show another second output example in which an attribute of the observed object is output as the support information 22D. Additionally, in the example shown in FIGS. 9A-9C, the game processing device 20 identifies the region of interest Z according to the first or second region example, and identifies the observed object according to the second observation example and the sixth observation example.

As shown in FIG. 9A, based on the position of the region of interest Z, the game processing device 20 specifies an observed object from among the objects 50 caused to be displayed by the HMD 10. For example, the game processing device 20 specifies, as an observed object, a treasure chest 50T, of which at least part is positioned at the region of interest Z for a specified time. The treasure chest 50T is a type of game item, and is a stationary object in a virtual space.

The object identification unit 21A determines whether the display of the treasure chest is blocked by an obstacle. Furthermore, the object identification unit 21A measures the time during which the display of the treasure chest 50T continues to be blocked.

The object identification unit 21A cancels identification of the treasure chest 50T when display of at least part of the treasure chest 50T is blocked by an obstacle for a specified time. Meanwhile, when display of at least part of the treasure chest 50T is blocked by an obstacle, and when the time during which display of at least part of the treasure chest 50T continues to be blocked is a period of time that does not satisfy the specified time, the object identification unit 21A continues to identify the treasure chest 50T as an observed object. Furthermore, the specified time to which the object identification unit 21A refers is a time during which the observed object is stationary, and is shorter than a time during which the observed object is moving.

For example, as shown in FIG. 9B, when a moving body such as a neutral character 50M is an obstacle of the treasure chest 50T, there is only a short time that the neutral character 50M blocks the display. The player P's observation of the treasure chest 50T is presumed to continue.

As the support information 22D corresponding to the treasure chest 50T, the game processing device 20 extracts information for displaying a content (attribute) of the treasure chest 50T. For example, the game processing device 20 anticipates from the progress of the game that a treasure sword 55 will be displayed as a content of the treasure chest 50T, and extracts, as the support information 22D, information for displaying the treasure sword 55. Next, when the game processing device 20 determines that the progress of the game is in a state in which the support information 22D can be output, as shown in FIG. 9C, an image of the treasure sword 55 that overlaps the treasure chest 50T is caused to be displayed by the HMD 10.

Thus, the player P can understand the content of the treasure chest 50T by an instruction operation of the player P's observation. At this point, identification of the treasure chest 50T as an observed object is cancelled when the display of the treasure chest 50T is blocked by an obstacle for a long period of time. Meanwhile, even if the display of the treasure chest 50T is blocked by an obstacle, if it is a short period of time, the treasure chest 50T continues to be identified as an observed object. Because of this, an object observed by the player P can be more accurately identified.

Moreover, the content of the treasure chest 50T is displayed as the treasure chest 50T is observed by the player. Thus, the game can be produced as if the treasure chest 50T is seen through by an ability of the player P.

Figure 10A:
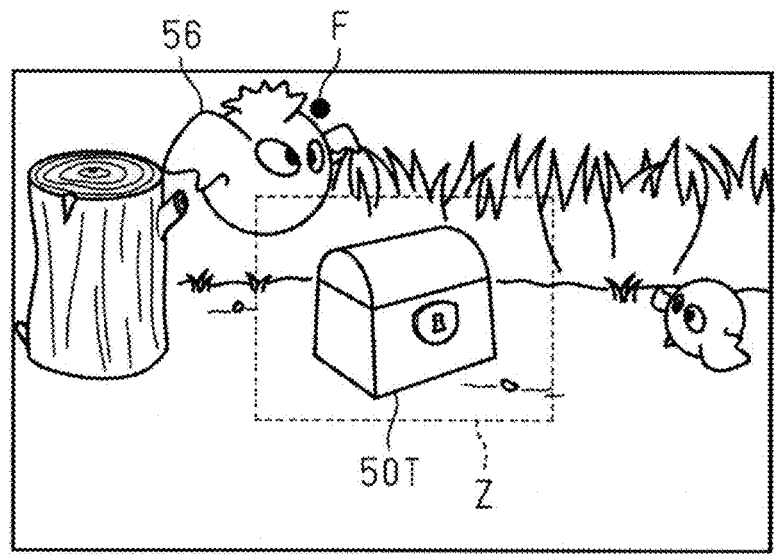
FIG. 10A is an image diagram showing an example of identification of an observed object.
Figure 10B:
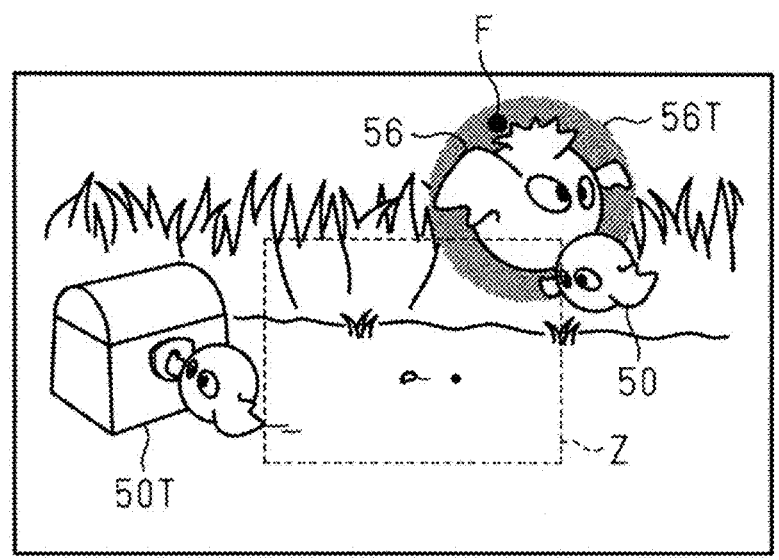
FIG. 10B is an image diagram showing an output example of support information.

FIGS. 10A and 10B show a third output example in which the fact that an observed object has transitioned to a selected state is output as the support information 22D. Furthermore, in examples shown in FIGS. 10A and 10B, the game processing device 20 identifies a region of interest Z according to the first region example and identifies the observed object according to the third observation example.

The game processing device 20 identifies as an observed object an object with an overlapping observation, from among the objects 50 caused to be displayed by the HMD 10. For example, as shown in FIG. 10A, while the region of interest Z is positioned at a center of an image, the game processing device 20 specifies an observed point F at a position different from the region of interest Z, based on a result of a detection by the sensor 12. Additionally, the game processing device 20 specifies as an observed object a target character 56 that overlaps the observed point F. That is, the game processing device 20 specifies as an observed object the target character 56, which is positioned outside of the region of interest Z. Furthermore, the observed object may be an object of which a part is included in the region of interest Z.

The game processing device 20 extracts the support information 22D corresponding to the target character 56. The support information 22D corresponding to the target character 56 is information showing that a selection is made by observation, for example, information showing that the target character 56 has been selected as a target.

When it is determined that the support information 22D can be output, as shown in FIG. 10B, the game processing device 20 overlaps an image of the target character 56 with an image 56T showing that selection is made as a target, and causes on the HMD 10 to display the image. Thus, the player P's selection of the target character 56, and the fact that the target character 56 has been selected, can be displayed through an instruction operation of the player P's observation.

Figure 11A:
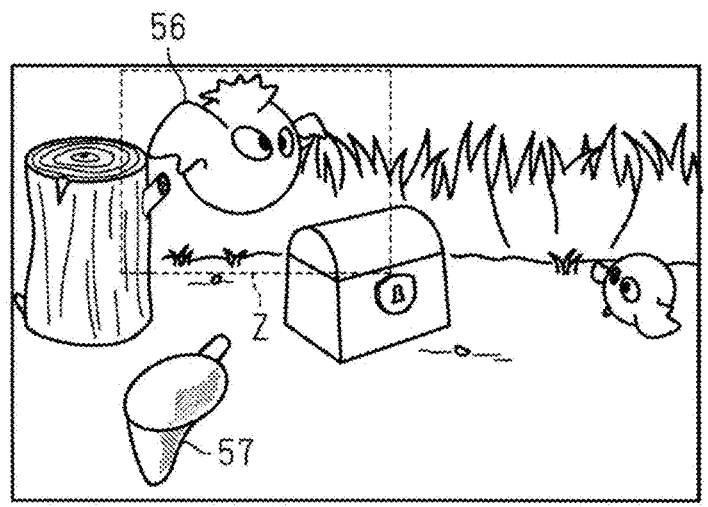
FIG. 11A is an image diagram showing an example before identification of an observed object.
Figure 11B:
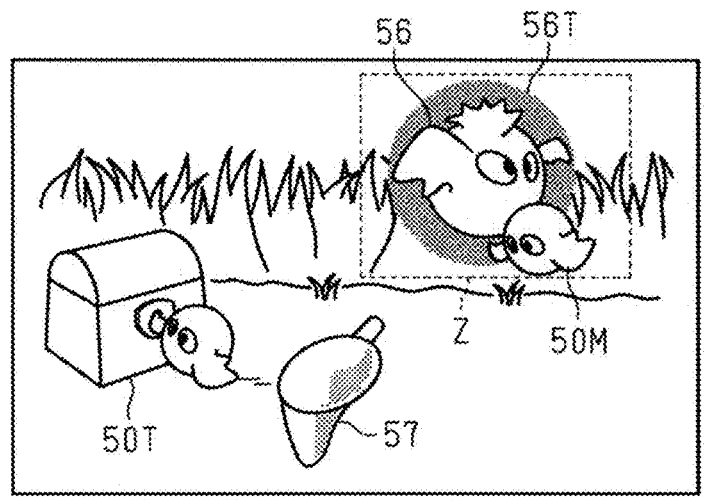
FIG. 11B is an image diagram showing an example of identification of an observed object.
Figure 11C:
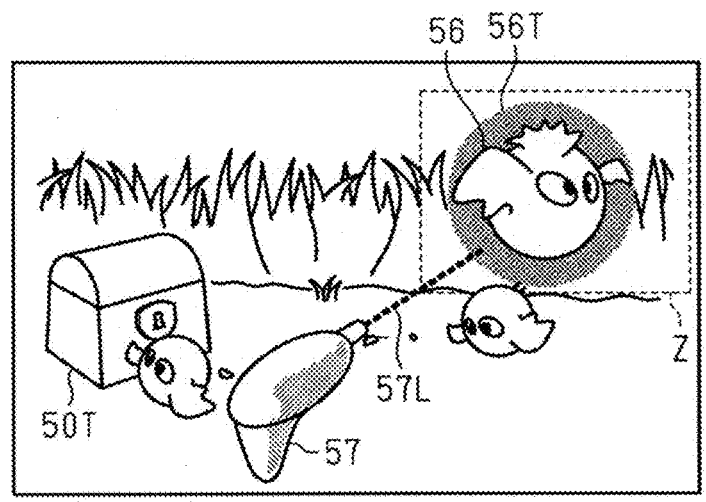
FIG. 11C is an image diagram showing an output example of support information.

FIGS. 11A-11C show another third output example in which the fact that an observed object has transitioned to a selected state is output as the support information 22D. Additionally, in the example shown in FIGS. 11A-11C, the game processing device 20 identifies a region of interest Z according to the first or second region example and identifies an observed object according to the fourth and fifth observation examples.

From among the objects 50 displayed by the HMD 10, the game processing device 20 identifies, as a candidate for the observed object, an object positioned in the region of interest Z. For example, as shown in FIG. 11A, the game processing device 20 identifies, as a candidate for the observed object, the target character 56 positioned in the region of interest Z. The target character 56 is a type of game character and is a moving body in the virtual space.

The object identification unit 21A determines whether the target character 56 follows movement of the region of interest Z in the virtual space V. For example, the game processing device 20 refers to the region of interest information 22C and understands that the region of interest Z moves from left to right in the figure as shown in FIG. 11B. Additionally, the game processing device 20 refers to the object information 22B and understands that the target character 56 also moves from left to right in the figure. Then, the game processing device 20 determines that the target character 56 follows movement of the region of interest Z and identifies the target character 56 as an observed object.

The object identification unit 21A determines whether the display of the target character 56 that is identified is blocked by an obstacle. Furthermore, the object identification unit 21A measures the time during which the display of the target character 56 continues to be blocked by the obstacle.

The object identification unit 21A cancels the identification of the target character 56 when the display of at least part of the target character 56 is blocked by an obstacle for a specified time. Meanwhile, when the display of at least part of the target character 56 is blocked by the obstacle, and the time that the display continues to be blocked is not long enough to reach the specified time, the object identification unit 21A continues to identify the target character 56 as an observed object. Furthermore, the specified time to which the object identification unit 21A refers is a time during which the observed object is a moving body and is longer than a period of time during which the observed object is a stationary body.

For example, as shown in FIG. 11B, there are cases in which a moving body such as the target character 56 may be hidden behind the neutral character 50M or move with the neutral character 50M. Furthermore, even during the period of time in which the target character 56 is hidden behind the neutral character 50M, if the period of the time is less than a specified period of time, the player P's observation of the target character 56 is presumed to continue. Because of this, the object of the moving body which is being observed by the player P can be more accurately identified.

The game processing device 20 extracts the support information 22D corresponding to the target character 56. In the same manner as in the example shown in FIGS. 10A and 10B, the support information 22D corresponding to the target character 56 is information showing that selection is made by observation, for example, information showing that the target character 56 is selected as a target.

When it is determined that the support information 22D can be output, as shown in FIG. 11B, the game processing device 20 overlaps the image of the target character 56 with the image 56T showing that selection is made as a target, and causes the image to be displayed by the HMD 10. Thus, the player P's selection of the target character 56, and the fact that the target character 56 has been selected, can be displayed by an instruction operation of the player P's observation. At this time, the game processing device 20 causes the attack target of a weapon 57 generated by the player P's operation to follow the movement of the target character 56. Additionally, as shown in FIG. 11C, the game processing device 20 causes the HMD 10 to display an indicator 57L in which the attack target of the weapon 57 is caused to follow the target character 56.

Thus, (i) selecting the target character 56 as an attack target and (ii) displaying of the selection being made may be realized by one instruction operation of the player P's observation. Additionally, the selected target character 56 is automatically tracked as an attack target of the weapon 57. Thus, the game can be produced as if automatic tracking were demonstrated by the player P's ability.

Figure 12:
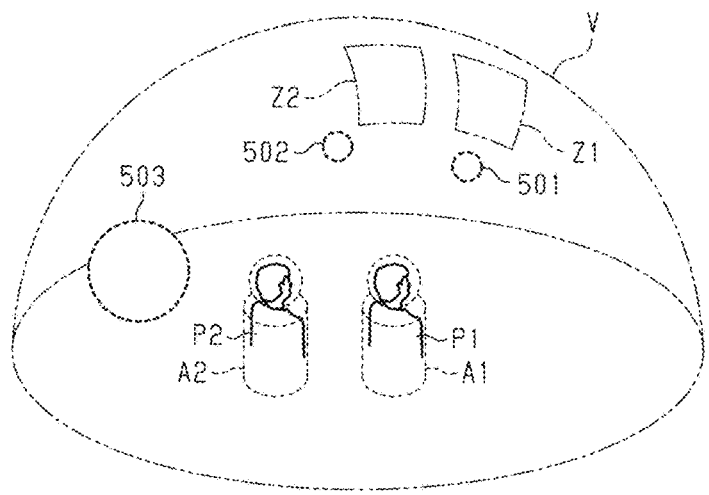
FIG. 12 is a spatial diagram showing positions of observed objects in a virtual space.
Figure 13A:
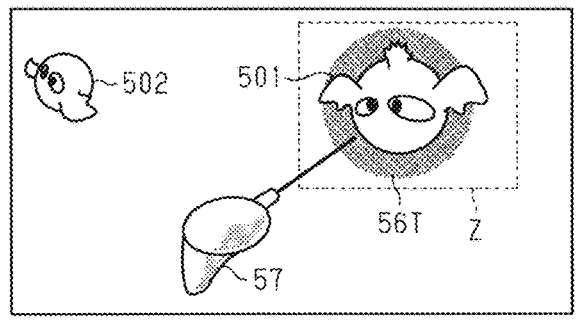
FIG. 13A is an image diagram showing an example of identification of an observed object.
Figure 13B:
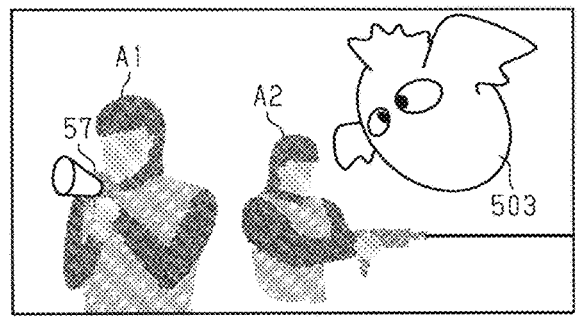
FIG. 13B is an image diagram showing an output example of support information.

FIGS. 12, 13A and 13B show a fourth output example in which an image of a field of view of an observed object is output as the support information 22D. Furthermore, in the example of FIGS. 12, 13A and 13B, the game processing device 20 identifies the region of interest Z according to the first or second region example and identifies the observed object according to the first, second, or third observation example.

As shown in FIG. 12, players P1 and P2 are wearing respective HMDs 10. One game processing device 20 identifies region of interests Z1 and Z2, one for each of the players P1 and P2. The game processing device 20 includes, on a screen that is caused to be output by each of the HMDs 10, avatars A1 and A2 associated with the respective players P1 and P2. The respective avatars A1 and A2 are, for example, combatant characters. For the avatars A1 and A2 associated with the respective players P1 and P2, images are displayed that are based on a position and an orientation of the heads of the respective players P1 and P2 associated with the avatars.

The game processing device 20 identifies objects that are being observed by the respective players P1 and P2. The game processing device 20 extracts the support information 22D corresponding to the observed objects. For example, as shown in FIG. 13A, the game processing device 20 identifies an enemy character 501 as an observed object and extracts the support information 22D corresponding to the enemy character 501. The support information 22D corresponding to the enemy character 501 is information showing that the enemy character 501 is selected as the player P1's target.

When it is determined that the support information 22D can be output, the game processing device 20 overlaps the image of the enemy character 501 with the image 56T showing that selection is made as a target, and causes the image to be displayed by the HMD 10 of the player P1. Furthermore, the game processing device 20 overlaps an image of an enemy character 502 with the image 56T showing that selection is made as a target and causes the image to be displayed by the HMD 10 of the player P2 as well.

After the game processing device 20 displays the image 56T, it causes the HMD 10 of the player P1 to output for a specified period of time an image of the field of view of the enemy character 501 in the virtual space V as the support information 22D. For example, the game processing device 20 changes a visual line direction for extracting an image to a direction toward the viewpoint of the player P from the enemy character 501. Additionally, the game processing device 20 changes the image that is caused to be displayed by the HMD 10 of the player P1 to an image that uses the changed visual line direction as a center. Furthermore, for example, as shown in FIG. 13B, the game processing device 20 causes the HMD 10 of the player P1 to output, for a specified period of time after the enemy character 501 is identified, the image of the field of view of the enemy character 501 in the virtual space V. Additionally, the game processing device 20 causes the HMD 10 of the player P2 to output, for a specified period of time after the enemy character 502 is identified, the image of the field of view of the enemy character 502 in the virtual space V.

Thus, a state in a field of view different from the fields of view of the players P1 and P2 may be understood by an instruction operation by observations of the players P1 and P2. Furthermore, the player P1 can understand the image in the field of view of the enemy character 501, and the player P2 can understand the image in the field of view of the enemy character 502.

The images in the fields of view of the respective enemy characters 501 and 502 are also pieces of information for the enemy characters 501 and 502 to determine the next movement. Because of this, the respective player P1 and P2 can predict the next movement that may be demonstrated by the enemy characters 501 and 502 that they are respectively observing. Additionally, the images in the fields of view of the respective enemy characters 501 and 502 also display an object 503 that exists behind the players P1 and P2. Because of this, taking into consideration the rearward of the players that cannot usually be understood, the respective players P1 and P2 can determine the next movement.

Thus, because the support information 22D for the observed object is displayed by identifying the observed object based on the orientation of the head, even if there is a state in which the players cannot see nearby via the HMD 10, the display of the support information 22D can be instructed.

[Hardware Structure]

Figure 14:
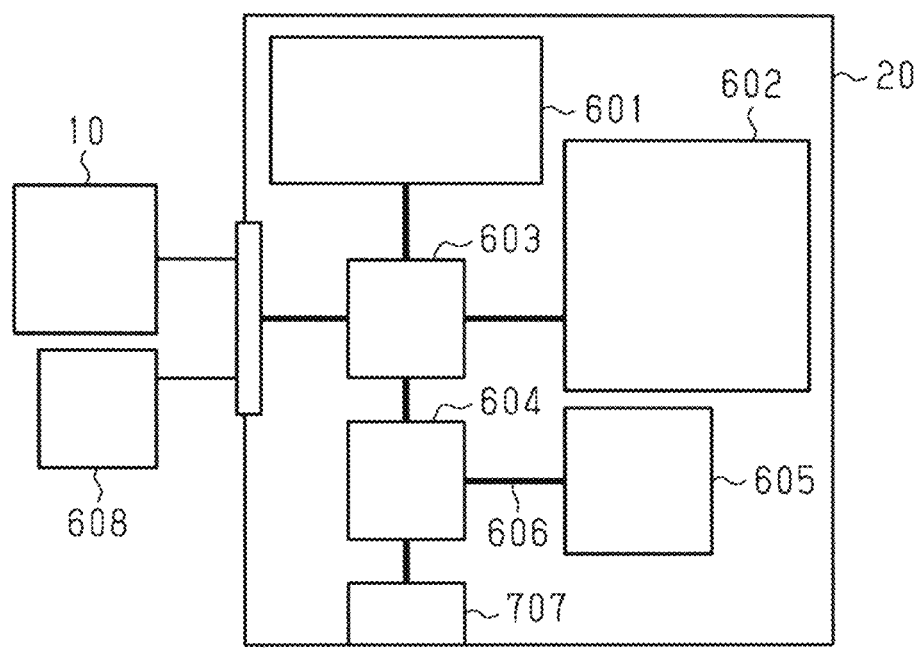
FIG. 14 is a block diagram showing a hardware structure of a game processing device.

FIG. 14 is a block diagram showing a hardware structure of the game processing device 20. The game processing device 20 is one of a desktop personal computer, a notebook personal computer, a Personal Digital Assistant (PDA), a server, or another type of computer. Hardware elements and a connecting mode between the hardware elements shown in FIG. 11 are an example.

The game processing device 20 is provided with a processor 601 and a memory 602. The game processing device 20 is provided with a northbridge 603, a southbridge 604, and a memory device 605. The processor 601, the memory 602, and the bridges 603 and 604 are connected to each other by various buses 606. The processor 601 oversees the progress of the game and causes the HMD 10 connected to the north bridge 603 to display images. Additionally, the game processing device 20 can realize functions of the processor 601 by using a plurality of processors, and can also realize functions of the memory 602 by using a plurality of memories.

The memory 602 is connected to the northbridge 603 and outputs to the processor 601 information regarding game processing. For example, the memory 602 is a volatile memory device or a non-volatile memory device. Additionally, for example, the memory 602 is a memory medium such as a magnetic or optical disk, or the like.

The memory device 605 is connected to the southbridge 604 and outputs to the processor 601 information on game processing. For example, the memory device 605 is a hard disk device, an optical disk device, a flash memory, or another memory device.

The northbridge 603 is connected to the HMD 10 and a controller 608. The southbridge 604 is connected to an expansion port 707. The expansion port 707 may also include various communication ports (for example, a USB, a Bluetooth (registered trademark) device, an Ethernet (registered trademark) device, a wireless Ethernet device) and may also be connected to an input/output device such as a keyboard, a mouse, a network device, or the like.

In the above-mentioned structure, the processor 601, the memory 602, and the northbridge 603 correspond to the control unit 21, and the memory 602 and the memory device 605 correspond to the memory unit 22.

As explained above, according to the above-mentioned embodiments, the following effects may be obtained.

(1) Objects that are being observed by the players P, P1, and P2 are identified, and the support information 22D regarding the observed objects that are identified is output. Because of this, the observations of the objects by the players P, P1, and P2 may be used as an output instruction of the support information 22D. As a result, an instruction regarding the output of the support information 22D may be smoothly output.

(2) The game can also be produced as if the thoughts of the player P are realized by the ability of the player P. As a result, the player P can be more attracted to the image of the virtual space V and the production using the image of the virtual space V.

(3) When the third output example is used, the instruction to select the observed object and the instruction to follow the observed object may be smoothly output. Furthermore, when the fourth output example is used, the instruction to select the observed object and the instruction to display the image in the field of view of the observed object may be smoothly output.

That is, the instruction to select the observed object and an operation along with an instruction other than this instruction may be issued by one observation.

(4) When the fourth observation example is used, an object that follows the movement of the region of interest Z is identified as an object observed by the player P. Thus, accuracy of identifying the observed object can be improved.

(5) When the fifth and sixth observation examples are used, the observed object is identified based on the fact that the time that the display is blocked by an obstacle does not reach a specified time. Because of this, even if there is an obstacle, the observed object may be identified. Additionally, regarding an observed object of which display is continually blocked by an obstacle, the identification can be canceled. As a result, accuracy of identifying the observed object can be improved.

Furthermore, each of the above embodiments may be implemented by appropriately modifying it as follows.

For a future status such as a future experience value or the like of a player character, the game processing device 20 can apply the first output example to the output of the future status. For example, the game processing device 20 understands the progress of the game such as frequency of the game being played, prediction of a transition of making a request for participating in a quest, a past experience value of the play character, and the like, and predicts a transition of a future experience value of the play character. For example, in a state in which the player P is presumably positive in terms of advancing the game, the experience value of the player character presumably increases for a short period of time. Furthermore, once the game processing device 20 identifies, as the observed object, text showing the experience value of the player character, the future status of the experience value of the player character is caused to be output by the HMD 10.

The game processing device 20 can output the past status of the observed object. The support information 22D for outputting the past status is, for example, a flashback of how the game character set as an observed object was developed up to the present. Furthermore, once the game processing device 20 identifies the game character as the observed object, the flashback of the game character is caused to be output by the HMD 10.

The game processing device 20 can apply the third output example to a soccer game or a baseball game. For example, when the third output example is applied to a soccer game, the game processing device 20 displays a plurality of objects in a goal and identifies an object observed by the player P as the observed object. Furthermore, the game processing device 20 guides to the observed object a ball created by an operation in which the player P kicks the ball. For example, when the third output example is applied to a baseball game, the game processing device 20 determines whether the player P is observing a ball thrown by a pitcher. The game processing device 20 identifies as an observed object the ball that is determined that the player P is observing. The game processing device 20 identifies, as an observed object, the ball that is determined to be being observed by the player P, and matches with a observed object a track of a bat that is generated by an operation of the player P's swing.

The game processing device 20 may calculate the position and the orientation of the head of the player P, using a detection result of the sensor 12. Alternatively the HMD 10 may also identify the observed object, using the detection result of the sensor 12 and the image that is being output by the display 13. Thus, the game processing device 20 may be provided with part of the functions of the HMD 10. Furthermore, the HMD 10 may be provided with part of the functions of the game processing device 20.

The object identification unit can also identify a direction toward the field of view, for example, based on (i) a position and/or orientation of a nose, or (ii) a position and/or orientation of a mouth. Furthermore, the orientation of the nose or the mouth may be determined, for example, as a direction toward the nose or the mouth from the back of the head.

Technical concepts that can be derived from the above embodiments and modified examples are added below.

[Addition 1]

An image display program that causes a control device to output virtual space information, wherein:

the control device is caused to function as (i) an object identification unit that identifies an object observed by the player from an image of a virtual space that is displayed on a display device, and (ii) a progress management unit that outputs support information that is information that is related to the object identified by the object identification unit and is advantageous to understanding of the virtual space.

According to the above Addition 1, it is possible to apply the image display program to a virtual reality system. The virtual reality system refers to, for example, (i) various simulations such as driving or vocational training of a moving body, (ii) training in the medical field, (iii) product monitoring, (v) observing movies, (iv) listening to music, or the like. Additionally, in these virtual reality systems as well, instructions regarding output of the virtual space information can be smoothly output.

[Addition 2]

An image display program that causes a control device to output virtual space information, wherein:

the control device is caused to function as an object identification unit that identifies an object observed by a player from an image of a virtual space that is displayed on a display device, wherein, regarding an object identified as being observed by the player, the object identification unit determines that the player is not observing the object when display of at least part of the object is continually blocked by an obstacle for a specified period of time.

[Addition 3]

An image display program that causes a control device to output virtual space information, wherein:

the control device is caused to function as an object identification unit that identifies an object observed by the player from an image of a virtual space that is displayed on a display device, wherein the object identification unit determines that the player is continually observing the object in a period of time in which display of at least part of the object is blocked, when the object that is identified that the player is observing is a moving body.

In the above Additions 2 and 3 as well, it is possible to apply the image display program to a virtual reality system. The virtual reality system refers to, for example, (i) various simulations such as driving or vocational training of a moving body, (ii) training in the medical field, (iii) product monitoring, (v) observing movies, (iv) listening to music, or the like. Additionally, in these virtual reality systems as well, accuracy of specifying an observed object can be improved.

EXPLANATION OF SYMBOLS

F Observed point
P Player
V Virtual space
Z Region of interest
10 HMD
11 HMD control unit
12 Sensor
13 Display
14 Speaker
20 Game processing device
21 Control unit
21A Object identification unit
21B Progress management unit
22 Memory unit
22A Image information
22B Object information
22C Region of interest information
22D Support information
50 Object

The invention claimed is:

1. A non-transitory computer-readable medium storing a game processing program that causes a processor to output virtual space information, wherein the game processing program causes the processor to perform the following steps:
  detecting an observed position by a player based on sensor data received from a sensor, the observed position being in a virtual space of a game that is displayed on a display device;
  identifying an object, which the player is observing, from an image of the virtual space that is displayed on the display device, wherein the object is identified based on the detected observed position; and
  displaying support information related to the identified object on the display device, wherein the displayed support information indicates an in-game operation that is performed in response to the observation of the object by the player, wherein
  the player is a real player, the sensor senses a physical attribute of the real player in real space as the sensor data based on which the observed position is detected, the sensor is a line-of-sight sensor, and the physical attribute is a line-of-sight direction of the real player,
  the displayed support information relates to the object identified based on the observed position detected based on the sensor data of the physical attribute of the real player in the real space,
  the object is a character or a game item displayed in the game, and at least one of a future status and an attribute associated with the character or the game item is displayed as the support information, the future status being displayed concurrently with a present status associated with the character or the game item and indicating a future movement or a location to which the character or the game item will move, and the support information being displayed only in response to the observation of the character or the game item by the player detected based on the detected observed position, and
  the identified object is displayed in the virtual space before the observed position is detected.

2. The non-transitory computer-readable medium according to claim 1, wherein
  the attribute, displayed as the support information, includes an image of the virtual space that is seen from the object.

3. The non-transitory computer-readable medium according to claim 1, wherein
  the attribute, displayed as the support information, includes information showing that the object has transitioned to a selected state due to the player's observing, and
  the processor causes movement of another object generated by an operation of the player to follow movement of the object in the selected state.

4. The non-transitory computer-readable medium according to claim 1, wherein
  the processor (i) sets at part of the image that is displayed on the display device a region of interest of the player that is identified by a position and an orientation of a specified portion of a body of the player and (ii) identifies at least part of the object that is positioned at the region of interest as the object that is being observed by the player.

5. The non-transitory computer-readable medium according to claim 4, wherein
  the processor identifies, as the object that is being observed by the player, an object that follows movement of the region of interest in the virtual space.

6. The non-transitory computer-readable medium according to claim 4, wherein
  the processor determines that the player is not observing the object when display of at least part of the object is continually blocked by an obstacle for a specified period of time.

7. The non-transitory computer-readable medium according to claim 4, wherein
  when the object identified as being observed by the player is a moving body, the processor determines that the player is continually observing the object during a period of time in which display of at least part of the object is blocked by an obstacle.

8. A game processing method comprising:
  detecting, using a processor, an observed position by a player based on sensor data received from a sensor, the observed position being in a virtual space of a game that is displayed on a display device;
  controlling, using the processor, an output of virtual space information;
  identifying, using the processor, an object, which the player is observing, from an image of the virtual space that is displayed on the display device, wherein the object is identified based on the detected observed position; and
  displaying, using the processor, support information related to the identified object on the display device, wherein the displayed support information indicates an in-game operation that is performed in response to the observation of the object by the player, wherein the player is a real player, the sensor senses a physical attribute of the real player in real space as the sensor data based on which the observed position is detected, the sensor is a line-of-sight sensor, and the physical attribute is a line-of-sight direction of the real player, the displayed support information relates to the object identified based on the observed position detected based on the sensor data of the physical attribute of the real player in the real space, the object is a character or a game item displayed in the game, and at least one of a future status and an attribute associated with the character or the game item is displayed as the support information, the future status being displayed concurrently with a present status associated with the character or the game item and indicating a future movement or a location to which the character or the game item will move, and the support information being displayed only in response to the observation of the character or the game item by the player detected based on the detected observed position, and the identified object is displayed in the virtual space before the observed position is detected.

9. A game processing device comprising:

a processor that controls an output of virtual space information; and a display device, wherein the processor is programmed to (i) detect an observed position by a player based on sensor data received from a sensor, the observed position being in a virtual space of a game that is displayed on the display device, (ii) identify an object, which the player is observing, from an image of the virtual space that is displayed on the display device, wherein the object is identified based on the detected observed position, and (iii) display support information related to the identified object on the display device, wherein the displayed support information indicates an in-game operation that is performed in response to the observation of the object by the player, and wherein the player is a real player, the sensor senses a physical attribute of the real player in real space as the sensor data based on which the observed position is detected, the sensor is a line-of-sight sensor, and the physical attribute is a line-of-sight direction of the real player, the displayed support information relates to the object identified based on the observed position detected based on the sensor data of the physical attribute of the real player in the real space, the object is a character or a game item displayed in the game, and at least one of a future status and an attribute associated with the character or the game item is displayed as the support information, the future status being displayed concurrently with a present status associated with the character or the game item and indicating a future movement or a location to which the character or the game item will move, and the support information being displayed only in response to the observation of the character or the game item by the player detected based on the detected observed position, and the identified object is displayed in the virtual space before the observed position is detected.

10. The non-transitory computer-readable medium according to claim 1, wherein the observed position is updated in accordance with updated sensor data, and the displayed support information is updated based on the updated observed position.

11. The game processing method according to claim 8, wherein the observed position is updated in accordance with updated sensor data, and the displayed support information is updated based on the updated observed position.

12. The game processing device according to claim 9, wherein the observed position is updated in accordance with updated sensor data, and the displayed support information is updated based on the updated observed position.

* * * * *